United States Patent

[11] 3,613,103

[72] Inventor Charles H. Harris
 Shrewsbury, Mass.
[21] Appl. No. 844,919
[22] Filed July 25, 1969
[45] Patented Oct. 12, 1971
[73] Assignee Alden Research Foundation
 Westboro, Mass.

[54] ANALOG SIGNAL MODIFYING APPARATUS
 12 Claims, 4 Drawing Figs.
[52] U.S. Cl.................................................... 346/74 R,
 178/6.6 B, 178/6.6 R, 178/6.7 R, 346/74 E
[51] Int. Cl....................................................... G01d 15/06,
 G03g 15/00, H04n 1/22
[50] Field of Search......................................... 345/74 R,
 74 P, 74 MP, 74 E; 178/6.6, 6.6 B, 6.7

[56] References Cited
 UNITED STATES PATENTS
2,924,653 2/1960 Fairchild..................... 178/6.6
3,325,818 6/1967 Nakagawa................... 346/74

3,463,880 8/1969 Corson....................... 178/6.7

Primary Examiner—Terrell W. Fears
Assistant Examiner—Howard W. Britton
Attorney—James H. Grover ABSTRACT: In an electrolytic paper recorder of electric signals, an analog signal is converted by a voltage controlled oscillator to a series of pulses with rises spaced in inverse proportion to the analog signal amplitude. The spaced rises trigger a pulse generator whose output is a corresponding series of constant amplitude marking pulses with a spatial density proportional to the original signal amplitude. The marking pulses are applied to the blade and helical electrodes of the recorder through a current starved amplifier which adjusts the pulse amplitude to compensate for random variations in the resistance of the electrolytic recording paper between the marking electrodes. The width of the marking pulses may be varied by a variable current source for the pulse generator so as to compensate for the nonlinear gamma characteristic of the paper.

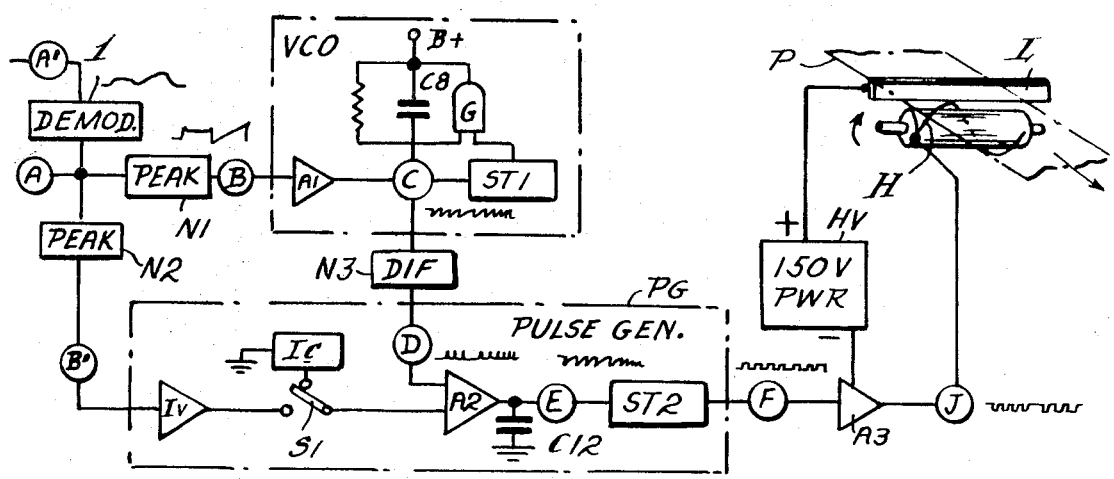
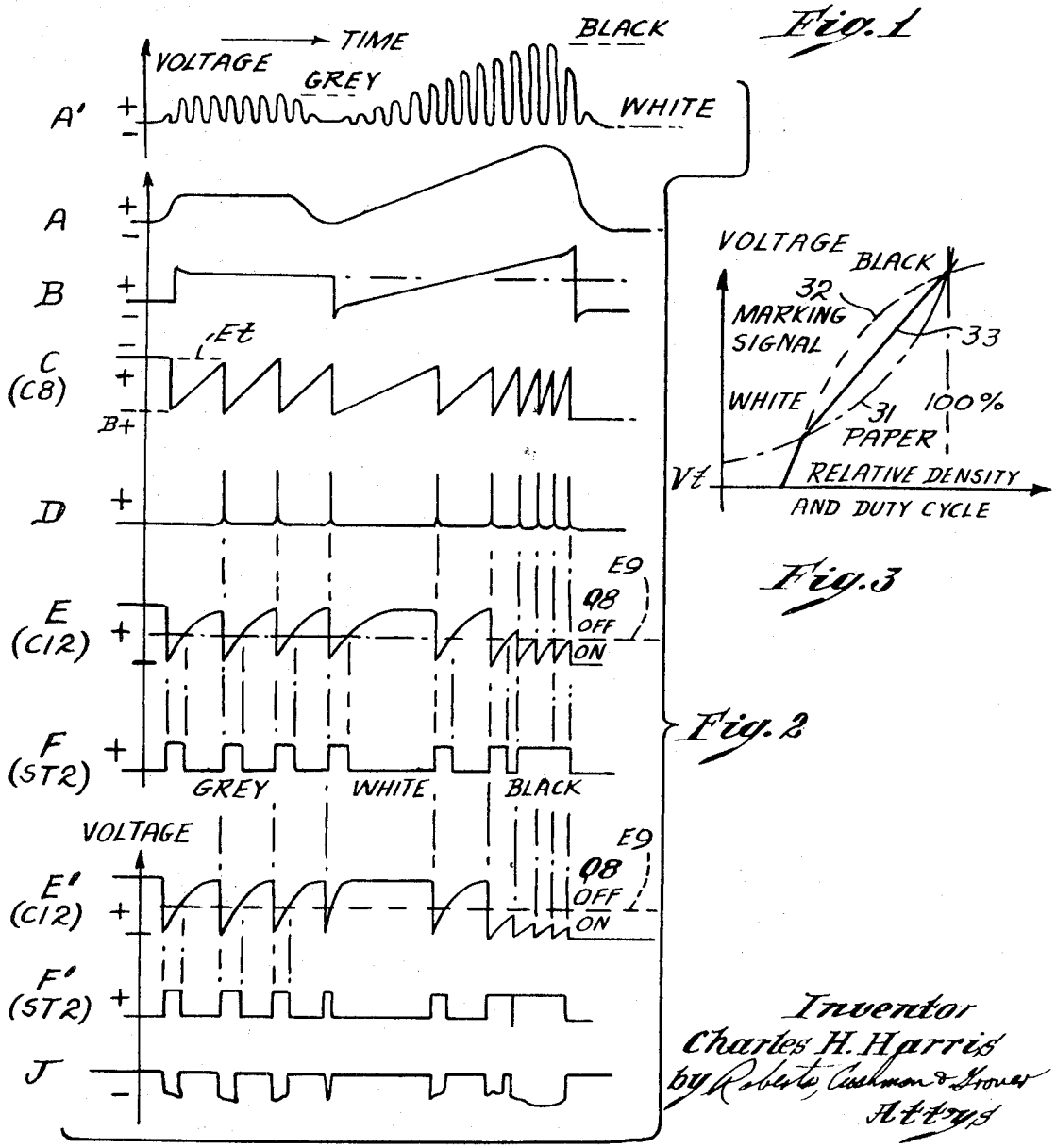
Fig. 1
Fig. 3
Fig. 2
Inventor
Charles H. Harris

3,613,103

ANALOG SIGNAL MODIFYING APPARATUS

BACKGROUND OF THE INVENTION

In the art of recording electrical analog signals on a moving web the signals may be generated by various devices including graphic facsimile scanners, ranging instruments such as fathometers, ceilometers, radars, simple analog transducers such as temperature or light sensors, and other signal sources. The signal is then transmitted by wire or other communication channel to a recorder. Most commonly the recorder marks the signal on an electrolytic paper by passing the analog signal between electrodes on opposite sides of the paper, but marks maybe made by heating and melting films on the surface of the paper, penetrating points of the film by impact, or by means of other marking transducers. The present invention is concerned with electronic modification of the signal for application to the marking transducer of the recorder.

Hitherto, the analog signal has in some instances comprised a simple varying direct current, particularly when the signal source is coupled by wire to a nearby marker, such as a strip chart recorder. In other instances, particularly when the signal is transmitted a distance by radio or relay, the analog signal is modulated on a carrier. When received such a signal is rectified and amplified as a single polarity, peaked, half sine wave modulated by the analog signal, and applied to the marking transducers as such an analog modulated half sine wave carrier.

Both types of recording signals, pure direct current analog and analog modulated carrier, are inherently deficient, to a degree dependent on the recording medium. An impact or heat sensitive paper essentially records only black marks of one density and cannot record other contrasting densities between white and black such as grey. And even the best electrolytic paper with a range of densities between white and dark sepia does not, with the signals mentioned, entirely faithfully reproduce the original analog information. Known electrolytic papers do not reproduce the white to black density ranges in linear relation to the analog signal. Also the resistance of such papers varies from point to point over the area of the paper, recording unequally dense marks for a given marking signal voltage amplitude. Moreover the papers have a lower amplitude signal threshold below which they record no mark, and a maximum signal amplitude limit above which the paper is burned. Consequently with pure direct current or modulated carrier signals it has not been possible to increase contrast or relative density of marks over a range by increasing or decreasing signal amplitude. Nor has it been possible to vary contrast without shifting the whole scale of densities thereby losing contrast either in the white or black range. Some improvement may be obtained by providing different designs of recorder amplifiers for the different signals and marking transducers, but this not only multiplies equipment, but also requires highly linear and highly stable components such as high cost transistors, adding to the expense of each piece of equipment.

Thus the objects of the present invention are to provide a single marking amplifier for universal use with various types of transmitted analog signals, marking transducers and recording media, which results in linear reproduction of the analog information with easily discerned contrast between recorded signals of different densities from white to black, which does not require expensive highly stable and linear components, and which generally improves the quality of recordings.

SUMMARY OF THE INVENTION

According to the invention electric analog signal modifying apparatus comprises an oscillator including means responsive to the analog signal to control the duration of the successive voltage rises of the oscillator dependent on the amplitude of the analog signal such that the interval between rises is inversely proportional to the analog signal amplitude during the interval, a constant amplitude pulse generator, and means coupling said oscillator and generator to cause the generator to produce said constant amplitude pulses at the intervals of said rises.

When such a series of such spaced pulses is utilized by marking means such as the electrodes of a current sensitive electrolytic paper recorder the recording limits of the paper need not be exceeded by the pulses which by their square wave nature operate at full amplitude, or 100 percent duty cycle and may rely for contrast on spatial distribution corresponding to the aforesaid rise intervals rather than individual mark density. That is even a paper recording black marks of only one density can record a white through grey to black scale of spatial densities much like a halftone print.

THE DRAWINGS

FIG. 1 is a diagram of an electrolytic signal recorder and a signal modifying circuit;

FIG. 2 is a series of graphs of voltage waveforms in the circuit and recorder;

FIG. 3 is a graph of recording signal voltage versus signal duty cycle and density of signals recorded on an electrolytic recording paper.

Figure 4:
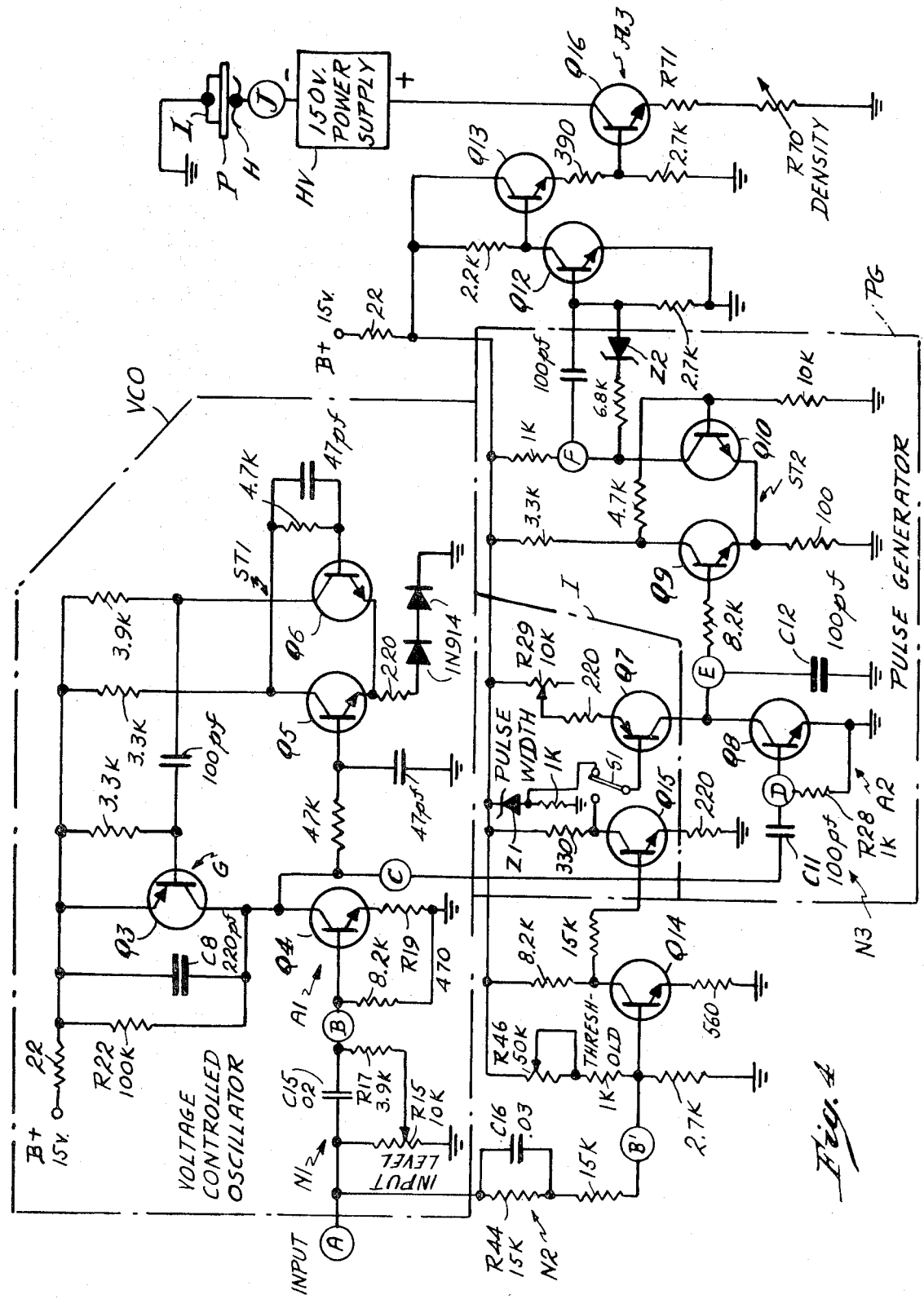
FIG. 4 is a schematic diagram of an electronic signal modifying circuit.

FIGURES 1 AND 2—ELECTROLYTIC RECORDER AND MARKING AMPLIFIER DIAGRAM AND VOLTAGE WAVEFORMS

The conventional electrolytic facsimile recorder shown in FIG. 1 comprises a helical electrode H carried on a rotating drum and opposed by a blade or linear electrode L. Between the electrodes is fed an electrolyte impregnated paper P or like recording medium. As the helical electrode is rotated its point of pressure against the paper and the blade repeatedly traverses the paper scanning successive lines as the paper advances line by line. Electric signals applied to the linear and helical electrodes cause marks to appear in the paper with a density related to the instantaneous amplitude of the signal voltage. Prior to being applied to the paper a signal received from a source is applied to one of two input terminals A or A' of a signal modifying or marking amplifier circuit whose output terminal is designated J. In this figure terminals or test points carrying the voltage waveforms of FIG. 2 are represented by the appropriate waveform letter, encircled.

The simple varying DC signal A of FIg. 2 may be applied directly to the marking amplifier. Or if the signal is modulated on a half sine wave carrier as with waveform A' it is converted by any suitable demodulator 1 to the DC form A. As shown the low amplitudes of the waveform A represent shades of white areas of the original copy from which the signal was generated, the middle amplitudes represent grey shades, and the highest amplitudes represent black shades. The signal A is sharpened in a peaking network N1 producing the waveform B which is applied to a voltage controlled oscillator VCO. The first stage of the VCO is a current starved amplifier A1 explained more fully with reference to FIG. 4 but briefly characterized as a transistor stage which conducts with a current amplitude dependent on its input signal voltage. Amplifier A1 serves as a current supply for charging a storage capacitor C8 whose charging and discharging cycle is illustrated by sawtooth waveform C. During charging the capacitor voltage C drops from its B+ supply toward ground. At a threshold voltage $E_t$ the voltage C trips a Schmitt trigger ST1 which opens a gate G and abruptly discharges the storage capacitor C8 restoring the voltage C to B+. Owing to the characteristic of amplifier A1 the charging rate of the capacitor and the slope of the sawtooth voltage C is dependent on the instantaneous amplitude of the analog waveform B and, as appears in FIG. 2, the time at which each sawtooth reaches the Schmitt trigger threshold voltage $E_t$ depends on the concomitant analog signal B amplitude. Thus the abrupt voltage rises of waveform C at discharge are spaced in time in inverse proportion to the signal amplitude.

These spaced voltage rises are detected by a differentiator N3 as a series of short pulses D whose spacing is the same as that of the rises in waveform C. Voltage waveform D is applied to a pulse generator PG. The first stage of the pulse generator is an amplifier A2 with alternative current supplies shown, for the purpose of illustration, as connected to the amplifier A2 through a switch S1. In the switch position shown a constant current supply Ic is used. With the switch transferred a variable current supply Iv is available. This latter supply comprises the analog signal A peaked by a network N2 to provide a sharpened signal B' like waveform B, and amplified by the stage Iv. 186 With either source the amplifier A2 controls the charge and discharge of a capacitor C12 whose sawtooth voltage waveform E or E' trips a second Schmitt trigger ST2. The Schmitt trigger produces a series of constant amplitude square pulses F or F' at the same intervals as the rises of the sawteeth E or E', respectively. With a constant current supply Ic the charging rate of each sawtooth E is the same and the resulting square pulses F are constant in width. With the current supply Iv varying according to the analog signal B' the square pulses F' vary in width accordingly.

The resulting square pulses F or F' are applied to a power amplifier A3 which controls a high voltage power supply HV for the marking electrodes H and L. The power amplifier A3, like amplifiers A1 and A2, has a current starved characteristic which introduces compensating changes in the marking signal when it encounters random variations in the resistance of the recording paper P so that the marking current will be held constant despite the paper variations.

To compensate also for the inherently nonlinear gamma characteristic of the paper the switch S1 is transferred to the position not shown, connecting the variable current supply Iv to the pulse generator and producing the variable width of the marking pulses F. As fully described hereinafter under FIG. 3—Paper Response to Marking Signal, varying the width of the marking pulses F' in inverse proportion to the amplitude of the input signal A compensates for the nonlinear gamma characteristic and produces a recording density in substantially linear relation with the input signal and with easily discerned contrast throughout the white to black range.

FIGURE 4—MARKING AMPLIFIER SCHEMATIC

In this FIG. component values are shown in ohms and microfarads unless indicated pf (picofarads). The semiconductor types are as follows:

Q3,Q7—Type 2N3638
Q4,Q5,Q6,Q8, Q9, Q10, Q12 and Q14—Type 2N706
Q13 and Q15—Type 2N2102
Q16—Type 40318
Z1 and Z2—Type 1N4732

Test points carrying the voltage waveforms of FIG. 2 are represented by the appropriate waveform identifying letter, encircled.

At the analog signal A input of the marking amplifier a peaking network N1 comprises a potentiometer R15, resistor R17 and capacitor C15. Potentiometer R15 affects white signal level amplification by controlling the voltage input level to the voltage controlled oscillator. This network produces a sharpened signal B at the base of a current starved amplifier A1 including transistor Q4 which forms a low impedance current supply of a circuit for charging the sawtooth generating capacitor C8. As previously explained, a current starved amplifier is characterized in that its emitter resistor causes the emitter current, and hence the collector current, to follow the input signal at its base, and thereby conduct with a current amplitude dependent on the input signal rather than the collector voltage. In this case the collector current of the transistor is limited by the emitter resistance R19. Thus, while the sharpened analog voltage B at the base of transistor Q4 controls its conduction and the charging rate of capacitor C8, the voltage C at the collector does not follow the analog input signal B but is also dependent upon the charge and discharge of the capacitor C8, both of whose terminals are at B+ voltage when discharged. By virtue of transistor Q4's action as a current source the charging rate of the capacitor C8 through transistor Q4 is held linear as shown by the straight line slopes in waveform C of FIG. 2. The voltage at the emitter of transistor Q4 also controls the transition of the Schmitt trigger ST1 comprising emitter coupled transistors Q5 and Q6. The Schmitt trigger with the gate G controls the discharge of capacitor C8. When the voltage increases negatively below the threshold Et of normally conducting transistor Q5 it abruptly cuts off causing conduction of transistor Q6. Transistor Q5 then triggers the gate transistor Q3 open providing a substantially instantaneous discharge path as the voltage C repasses the Schmitt trigger threshold and returns to B+ supply voltage.

As capacitor C8 charges through transistor Q4 its charging rate or the slope of its ramp varies according to the concomitant amplitude of the analog voltage B. As shown at C in Fig. 2 this slope is high for low amplitude analog voltage and vice versa. For steady amplitude analog voltages a series of equally sloped sawteeth are produced. At the end of each sawtooth slope the capacitor C8 discharges vertically, reversing the voltage C. Thus a series of sawteeth are produced with slopes dependent on the concomitant analog signal amplitude, and with the interval between the vertical rises also dependent on signal amplitude.

The variable interval sawtooth voltage C is coupled through a differentiating network N3 comprising resistor R28 and capacitor C11 which produce a series of brief voltage spikes D at the same intervals as the rises of sawtooth voltage C. These spikes are applied to the base of a starved amplifier A2 comprising transistor Q8 which forms the discharge path for a second sawtooth generating capacitor Cl2. The charging path for capacitor C12 includes a charging amplifier Q7 to whose base is supplied a constant voltage from a Zener diode Z1 or with a variable voltage from a transistor Q15 depending on the position of a switch S1. The alternate, variable voltage supply in a second signal channel Q14–Q15 is described in the subsequent section, FIG. 3—Paper Response to Marking Signal.

With switch S1 in the position shown, the Zener diode Z1 holds the base of transistor Q7 at a constant voltage level. The current supplied by transistor Q7 to capacitor C12 and hence the charging rate of the capacitor will depend on the resistance of a potentiometer R29. In the absence of a spike at the base of transistor Q8 capacitor C8 charges from the B+ supply at the established rate as shown by voltage waveform E. With each spike, transistor Q8 conducts sufficiently to discharge the capacitor to ground causing an abrupt vertical excursion to zero of the voltage E. The spikes may occur at a faster rate than the capacitor can recharge to B+ as indicated at the extreme right of voltage waveform E in FIG. 2.

The resulting sawtooth voltage waveform E is applied to a second Schmitt trigger ST2 comprising transistors Q9 and Q10. Normally conducting transistor Q9 is caused to cut off during the time from each discharge of voltage E until the voltage again rises above the threshold voltage E9 of transistor Q9. In this time period transistor Q10 abruptly starts and remains conducting until the threshold E9 of Q9 is exceeded. If, as in the extreme right of voltage waveform E, the threshold is not exceeded during several sawteeth occurrences, transistor Q10 remains conducting. The resulting voltage waveform F at the collector of transistor Q10 is a series of constant width, constant amplitude square pulses occurring at each discharge of capacitor C12 except when they overlap to form a continuous long pulse as shown at the extreme right of waveform F. When the pulses are widely spaced they represent the white values of the original analog signal A; when more closely spaced, the grey values; and when continuous or nearly so, the black values. The width of the pulse may be controlled by adjustment of potentiometer R29.

The voltage F is amplified through two driver transistors Q12 and Q3 without significant change in waveform, then supplied to a third current starved amplifier A3 comprising a power transistor Q16. The power transistor Q16 is in series with a 150 volt power supply HV, the helical electrode H, electrolytic paper P and linear blade electrode L. Also in this series circuit, and in the base to emitter circuit of transistor Q16, are a fixed resistor R71 and a resistor R70 variable between 0 and 50 ohms. While the voltage J across the paper tends to follow the constant amplitude of driving pulses F at the base of transistor Q16, the marking current between the electrodes H and L through the paper P is affected by random variations in the resistance of the paper throughout its area. Uncompensated, these variations would result in uneven density of the marks recorded on the paper. But in the circuit shown an increase, for example, in paper resistance will result in a decrease in current through resistors R70 and R71, a reduction of the base to emitter voltage of transistor Q16 which forward biases transistor Q16 resulting in compensation increase in current to predetermined constant level, and a momentary rise in the voltage J shown as variations in the voltage pulse amplitude. This voltage increase compensates for the paper resistance variation and holds constant the marking current and hence the density of the recorded mark. The desired mark density may be selected by adjustment of the potentiometer R70.

FIGURE 3—PAPER RESPONSE TO MARKING SIGNAL

The above-described compensation for random resistance variations over the area of the paper is to be distinguished from correction of the general gamma characteristic of the paper, that is, nonlinear relation between the amplitude and duration of the current applied to the paper and the densities of the marks recorded. This paper response characteristic 31 is shown somewhat idealized in dash-dot line FIG. 3. From a threshold voltage $Vt$, below which the paper does not record, increases in marking voltage produce less and less increase in mark density. As previously explained, this characteristic is undesirable because it is difficult for the eye to observe slightly different tone gradations in the black range.

In the production of the equal amplitude pulse series D from the analog signal A a linear relation is maintained between the analog signal amplitude and the interval between the pulses of waveforms D and F. Thus the average spatial density of marks recorded by the constant width voltage F pulses has the same characteristic curve 31 as do those which would be recorded by the analog signal A. Compensation for the undesired paper gamma characteristic is achieved by a second signal channel shown in FIG. 4 between the analog input signal A, through transistors Q14 and Q15 to the discharge amplifier Q8. The second channel is effective and the Zener diode Z1 disconnected when switch S1 is transferred to the position not shown.

In the second channel the analog signal A is sharpened by a second peaking network N2 comprising resistor R44 and capacitor C16 and appears as waveform B' substantially the same as waveform B of FIG. 2. The sharpened analog signal B' is amplified by transistor Q14 at whose base is a potentiometer R46 for adjusting the gain threshold of transistor Q14. The amplified analog signal is amplified by a transistor Q15 which, with transistor Q7, comprises a variable current source for the charging transistor Q8 of capacitor C12. The current supplied to transistor Q8 for charging capacitor C12 follows the amplified analog signal at the base of transistor Q7. Since the charging rate or slope of the capacitor depends on the supply voltage, the slope of the sawtooth charging waveform will vary as shown at E' of FIG. 2. With transistor Q15 as a variable current source replacing the constant current source Z1 the grey level sawteeth at the left have the same slope, whereas the central, white level sawtooth has a distinctly higher slope. And the right hand, black range signals have a lower slope which extends the sawtooth beyond the interval between pulses D to the extent that discharge of the capacitor C12 through transistor Q8, when triggered by a pulse of series D, occurs before each sawtooth charging ramp has reached or greatly exceeded the threshold voltage E9 of the second Schmitt trigger ST2. As previously explained, the Schmitt trigger pulse output E' occurs during the time from each discharge until the charging voltage rises above the adjustable threshold E9. Thus, the width of the Schmitt trigger pulses in waveform F', in contrast with those of waveform F, vary in width accordingly as the time during which the sawteeth of waveform E' extend below the Schmitt trigger threshold E9.

Since the width of the pulses in series F' is inversely proportioned to the concomitant amplitude of the analog voltage B', the duty cycle, or percentage of time which the pulses are at full amplitude, also varies inversely with the analog amplitude. This relation of pulse voltage to duty cycle is plotted as dashed line curve 32 in FIG. 3. The voltage v. duty cycle curve 32 is, between its intercepts with the paper gamma, voltage v. density curve 31, concave downward while the gamma curve is concave upward. While FIG. 3 is simplified for clarity of explanation, it can be understood that the application of a marking voltage following curve 32 to a paper responding according to curve 31 results in analog voltage v. actually recorded mark density (solid line) curve 33 which is intermediate curves 31 and 32 and which approaches or equals a linear voltage v. density relation.

This linear relation, a principal object of the present invention, means that all shades of the original copy from the white to the black ranges will be recorded with densities which to the eye have contrast corresponding to the original copy and its analog signal A, rather than the prior disproportionate contrast in the white ranges and diminishing contrast in the black range.

I claim:
1. Electric analog signal modifying apparatus comprising:
   an oscillator producing successive voltage rises and including direct current means responsive to a direct current analog signal to control the duration of the successive voltage rises of the oscillator dependent on the amplitude of the analog signal such that the interval between rises is inversely proportional to the analog signal amplitude during the interval,
   a constant amplitude pulse generator, and means coupling said oscillator and generator to cause the generator to produce said constant amplitude pulses at the intervals of said rises.
2. Apparatus according to claim 1 wherein said oscillator comprises a storage capacitor, and means responsive to said analog signal to charge and discharge said capacitor, whereby the charging rate and discharge time of said capacitor are dependent on said analog signal.
3. Apparatus according to claim 2 wherein said discharge means comprises switch means triggered by the charge voltage of said capacitor to discharge condition at a predetermined threshold voltage.
4. Apparatus according to claim 3 wherein said discharge means comprises a Schmitt trigger responsive to said capacitor charge voltage and said analog signal, and gate means on a path parallel with the capacitor and responsive to the Schmitt trigger to complete said path.
5. Apparatus according to claim 1 wherein said pulse generator comprises a storage capacitor, means to charge said capacitor, means responsive to the oscillator pulses to discharge said capacitor, and switch means triggered at a predetermined threshold voltage, and responsive to discharging of said capacitor lower than said voltage to produce a constant amplitude pulse during the interval of said lower voltage.
6. Apparatus according to claim 5 wherein said means to charge comprises a constant current source, whereby the interval of said lower voltage and of said pulse is substantially constant.
7. Apparatus according to claim 5 wherein said means to charge is a variable current source responsive to said analog signal to vary the interval of said lower voltage and of said pulse dependent on the amplitude of the analog signal during said interval.

8. Apparatus according to claim 1 characterized by current sensitive utilization means varying in impedance, and pulse output means interconnecting said pulse generator and utilization means, wherein said pulse output means comprises a current starved amplifier responsive to each pulse and to the instantaneous impedance of said utilization means to adjust the voltage amplitude of each pulse thereby to hold the pulse current constant with varying impedance.

9. Apparatus according to claim 8 wherein said utilization means comprises means for applying said pulses to an electrosensitive recording medium.

10. Apparatus according to claim 9 wherein said pulse applying means comprises electrodes on opposite sides of an electrolytic recording paper having a nonlinear gamma characteristic.

11. Apparatus according to claim 9 wherein the aforesaid pulse generator comprises means further responsive to said analog signal to vary the width of said pulses inversely dependent on the amplitude of the analog signal thereby to record on said paper with marks whose apparent density is substantially in linear relation to the analog signal.

12. Electrolytic facsimile apparatus for recording analog signals on electrolytic paper having a nonlinear gamma characteristic and a varying resistance to marking current comprising:

an analog signal input terminal (A), a voltage controlled oscillator (VCO) including a first storage capacitor (C8), a current source (B+) for charging said first capacitor, a current starved amplifier (Q4) connected between said input terminal and capacitor for holding the charging rate of the capacitor linear, a gate (Q3) for discharging the first capacitor, and a first trigger circuit (ST1) for opening the gate, said first trigger circuit having a first voltage threshold (E$t$) at which it undergoes transition and being responsive to charge of said capacitor above said threshold to open said gate and discharge the first capacitor, thereby to produce a first sawtooth voltage (C) with a series of rises spaced by charging slopes at time intervals inversely proportional to the amplitude of the analog signal;

a differentiator network (N3) converting said rises into a series of voltage spikes (D);

a pulse generator (PG) including a second storage capacitor (C12), a variable current source (I$v$) for charging said second capacitor and comprising voltage amplifying means (Q15, Q7) coupled to said input terminal and responsive to said analog signal to vary the current supplied to, and the charging rate of, said second capacitor, a discharge amplifier (Q8) connected between said differentiator network and said second capacitor and responsive to said voltage spikes to form a discharge path for said second capacitor, charge and discharge of said capacitor producing a second sawtooth voltage (E') with spaced rises having slopes varying in inverse proportion to the amplitude of the analog signal, whereby said slopes are below a second threshold voltage (E9) for varying periods, and a second trigger circuit (ST$^2$) connected to said second capacitor and responsive to said second sawtooth voltage to produce a second series of constant amplitude voltage pulses (E') individually varying in duration as the periods sawtooth voltage below said threshold, pulse output means including a second power supply (HV) and a current starved amplifier (Q16) connected between second trigger circuit and said power supply, an electrolytic recorder including opposed electrodes connected through said power supply to said second current starved amplifier for applying a marking current to an electrolytic paper therebetween during the pulses of said second series, said second series of voltage pulses (F') having, as a result of the varying duration of the pulse periods, a voltage versus density characteristic compensating for the nonlinear gamma characteristic of the paper, and said second current starved amplifier being responsive to variations in the resistance of said paper to said marking current to adjust the marking current to compensate for said resistance variations.